(12) United States Patent
Hou (10) Patent No.: US 9,367,403 B2
(45) Date of Patent: Jun. 14, 2016

(54) TERMINAL AND APPLICATION RESTORING METHOD

(71) Applicants:Dongguan Yulong Telecommunication Tech Co., Ltd., Dongguan, Guangdong (CN); Yulong Computer Telecommunication Scientific (Shenzhen) Co., Ltd., Shenzhen, Guangdong (CN)

(72) Inventor: Yan Hou, Guangdong (CN)

(73) Assignees: DONGGUAN YULONG TELECOMMUNICATION TECH CO., LTD. (CN); YULONG COMPUTER TELECOMMUNICATION SCIENTIFIC (SHENZHEN) CO., LTD. (CN)

( * ) Notice: Subject to any disclaimer, the term of this patent is extended or adjusted under 35 U.S.C. 154(b) by 0 days.

(21) Appl. No.: 14/342,898

(22) PCT Filed: Dec. 10, 2012

(86) PCT No.: PCT/CN2012/086265
§ 371 (c)(1),
(2) Date: Mar. 5, 2014

(87) PCT Pub. No.: WO2014/089734
PCT Pub. Date: Jun. 19, 2014

(65) Prior Publication Data
US 2015/0278033 A1 Oct. 1, 2015

(51) Int. Cl.
*G06F 11/00* (2006.01)
*G06F 11/14* (2006.01)
(Continued)

(52) U.S. Cl.
CPC ........ *G06F 11/1469* (2013.01); *G06F 3/04817* (2013.01); *G06F 8/61* (2013.01); *G06F 9/445* (2013.01); *G06F 2201/84* (2013.01)

(58) Field of Classification Search
CPC ............ G06F 11/1469; G06F 11/1438; G06F 3/04817; G06F 8/61
See application file for complete search history.

(56) References Cited

U.S. PATENT DOCUMENTS 5,911,041 A 6/1999 Schaffer
6,397,381 B1 * 5/2002 Delo et al. .................... 717/174
(Continued)

FOREIGN PATENT DOCUMENTS

CN 1282915 2/2001
CN 102314367 1/2012

OTHER PUBLICATIONS

Dial Up Internet Access, software@ccc.net.cn, pp. 20-22.
(Continued)

*Primary Examiner* — Philip Guyton
(74) *Attorney, Agent, or Firm* — Onello & Mello, LLP (57) ABSTRACT

The present invention provides a terminal, comprising: a judging unit for judging whether an application corresponding to a desktop icon can run normally upon receiving an operation instruction triggering the desktop icon; and a restoring unit for restoring the application in a preset manner when the application cannot run normally. Correspondingly, the present invention also provides an application restoring method. The technical solutions of the present invention can automatically restore an application that cannot run normally when the desktop icon is triggered, and can execute corresponding functions according to different responses to improve users' experience.

16 Claims, 6 Drawing Sheets

(51) Int. Cl.
*G06F 9/445* (2006.01)
*G06F 3/0481* (2013.01)

(56) References Cited

U.S. PATENT DOCUMENTS 6,453,469 B1     9/2002   Jystad
7,146,531 B2 *  12/2006   Sarra et al. .................... 714/15
2002/0122076 A1 *  9/2002   Nakaki .......................... 345/847
2007/0174832 A1 *  7/2007   Brehm et al. .................. 717/174
2012/0311280 A1 * 12/2012   Schmidt et al. ............... 711/162

OTHER PUBLICATIONS

International Search Report dated Feb. 28, 2013, issued in PCT/CN/2012/086265.

* cited by examiner

TERMINAL AND APPLICATION RESTORING METHOD

FIELD OF THE INVENTION

The present invention involves the technical field of communication, and specifically, to a terminal and an application restoring method.

BACKGROUND OF THE INVENTION

With the developments of intelligent terminals, various applications kick in, and the desktop icons of multiple applications can be set at the desktop of the terminal to quickly start corresponding applications. To avoid file loss, the backups of the applications can be made. Suppose a terminal comprises an application A and the desktop icon corresponding to the application A is set at the desktop, a user makes the backups of the desktop icon and the location corresponding to the application A, thus a backup J is formed.

If the user deletes the application A, then the desktop icon corresponding to the application A will also be deleted. When the user has restored the deleted application through the backup J, the desktop icon corresponding to the restored application A will appear at the original location of the desktop of the terminal, then, if the user clicks the desktop icon, an error will occur or it is prompted that the application has not be installed, which severely affects user's normal use.

Therefore, an application restoring technology is desired, which can restore and display the deleted desktop icon at the original location of the desktop of the terminal after the deleted application has been restored through a backup file, and execute corresponding functions according to different responses when triggering the desktop icon to improve user's experience.

SUMMARY OF THE INVENTION

Considering the above background art, the technical problem to be solved by the present invention is to provide an application restoring technology, which can restore and display a deleted desktop icon at the original location of the desktop of a terminal after the deleted application has been restored through a backup file, and execute corresponding functions according to different responses when triggering the desktop icon to improve user's experience.

Therefore, according to an aspect of the present invention, a terminal is provided, comprising a judging unit for judging whether an application corresponding to a desktop icon can run normally upon receiving an operation instruction triggering the desktop icon, and a restoring unit for restoring the application in a preset manner when the application cannot run normally.

In the above technical solution, preferably, a displaying unit of the terminal is further used to display a desktop icon corresponding to a deleted application at the desktop of the terminal when the deleted application is restored through a backup file.

After the deleted application has been restored through the backup file, the deleted desktop icon can be restored and displayed at the desktop of the terminal, and when the desktop icon is triggered, whether the application has been installed can be judged, if it has not been installed, the installation file of the application is acquired, the interface of the application is directly entered after the installation is finished, so that the user can normally use the application, thus user's experience is improved. If the application has been installed, the interface of the application is directly opened.

In the above technical solution, preferably, it further comprises: an acquiring subunit for acquiring the installation file of the application and installing the application, and/or repairing the association relationship between the desktop icon and the application.

In the above technical solution, preferably, the acquiring subunit is used to acquire the installation file according to information in the backup file relevant to the application, and the information comprises the file name of the installation file, the version information of the installation file, and the key content and/or resource address of the installation file; and the restoring unit further comprises a lookup subunit for finding out the installation file based the information through a network server or a local server and installing the installation file.

As the backup of the application has been made before, the installation file can be found out for the application initiatively through the information in the backup file. The installation file can be downloaded or searched based on the key information of the installation file through a search engine or other search devices, the desired installation file can be acquired through flexible uses of current networks, the user does not need to input the key information of the installation file to look up the desired installation file, and the whole search and installation process can be completed only with one triggering signal, which is convenient and quick.

In the above technical solution, preferably, the acquiring subunit is further used to extract the installation file from a local storage device and install the same when the backup file already has the backup of the installation file therein. Of course, if the backup file already has the backup of the installation file, then it will be relatively simple, as it is only necessary to extract the installation file that has been backed up from the local storage device and then install it, which is also convenient and quick.

In the above technical solution, preferably, the judging unit is further used to judge whether the local storage device stores the installation file therein; the acquiring subunit is further used to extract the installation file from the local storage device and install it when the judging unit judges that the installation file has been stored, and to find out the installation file and install it through a network server or a local server when the judging unit judges that the installation file has not been stored.

If the backup file does not back up the installation file therein or back up other relevant information of the application, and the local storage device does not have the corresponding installation file, the relevant installation file needs to be downloaded according to the desktop icon through a search engine or application market program, if there is not the search engine or the application market program, it is prompted that the application corresponding to the desktop icon has been deleted and should be downloaded again and installed, and different prompts or functions can be rendered according to different responses.

In any of the above technical solutions, preferably, the displaying unit of the terminal is further used to display a preset interface or preset information at the desktop icon during restoring the application.

In any of the above technical solutions, preferably, the displaying unit of the terminal is further used to gray display the desktop icon when the application has not been restored; and/or the terminal further comprises: a prompting unit for prompting that the application has been deleted when the application has not been restored.

Gray displaying the desktop icon shows that the application of the desktop icon has not been installed and the corresponding installation file has not been found, if it is necessary to use the application, the corresponding installation file needs to be downloaded again, to avoid user's multiple invalid clicking on the desktop icon or forgetting downloading the application.

According to another aspect of the present invention, an application restoring method is provided, comprising following steps: judging whether an application corresponding to a desktop icon can run normally upon receiving an operation instruction triggering the desktop icon; and restoring the application in a preset manner when the application cannot run normally.

In the above technical solution, preferably, prior to the step of judging whether the application corresponding to the desktop icon can run normally upon receiving the operation instruction triggering the desktop icon, the method can further comprise: displaying a desktop icon corresponding to a deleted application at the desktop of the terminal when the deleted application is restored through a backup file.

After the deleted application has been restored through the backup file, the deleted desktop icon can be restored and displayed again at the desktop of the terminal, and when the desktop icon is triggered, whether the application has been mounted is judged, if it has not been installed, the installation file of the application is acquired, and the interface of the application is directly entered after the installation is finished, so that the user can normally use the application, which improves user's experience. If the application has been installed, the interface of the application is directly opened.

In the above technical solution, preferably, the step of restoring the application in a preset manner when the application cannot run normally is specifically as follow: acquiring the installation file of the application and installing the application, and/or repairing the association relationship between the desktop icon and the corresponding application.

In the above technical solution, preferably, the process of acquiring the installation file comprises: acquiring the installation file according to information in the backup file relevant to the application, and the information comprises the file name of the installation file, the version information of the installation file, and the key content and/or resource address of the installation file; and finding out the installation file based on the information in a local storage device or through a network server.

As the backup of the application has been made before, the installation file can be found out for the application initiatively through the information in the backup file.

The installation file can be downloaded or searched based on the key information of the installation file through a search engine or other search devices, the desired installation file can be acquired through flexible uses of current networks, the user does not need to input the key information of the installation file to look up the desired installation file, and the whole search and installation process can be completed only with one triggering signal, which is convenient and quick.

In the above technical solution, preferably, the installation file is extracted from a local storage device and installed when the backup file already has the backup of the installation file therein. Of course, if the backup file already has the backup of the installation file, then it will be relatively simple, as it is only necessary to extract the installation file that has been backed up from the local storage device and then install it, which is also convenient and quick.

In the above technical solution, preferably, the process of acquiring the installation file comprises: judging whether the local storage device stores the installation file therein, if it stores the installation file, extracting the installation file from the local storage device and installing it; if it does not store the installation file, finding out the installation file through a network server or a local server and installing it.

If the backup file does not back up the installation file therein or back up other relevant information of the application, and the local storage device does not have the corresponding installation file, the relevant installation file needs to be downloaded according to the desktop icon through a search engine or application market program, if there is not the search engine or the application market program, it is prompted that the application corresponding to the desktop icon has been deleted and should be downloaded again and installed, and different prompts or functions can be rendered according to different responses.

In any of the above technical solutions, preferably, a preset interface is displayed or preset information is displayed at the desktop icon during restoring the application.

In any of the above technical solutions, preferably, when the application has not been restored, it is prompted that the application has been deleted and/or the desktop icon is gray displayed. Gray displaying the desktop icon shows that the application of the desktop icon has not been installed and the corresponding installation file has not been found, if it is necessary to use the application, the corresponding installation file needs to be downloaded again, to avoid user's multiple invalid clicking on the desktop icon or forgetting downloading the application.

The terminal according to the present invention can judge the restored desktop icon: if the application corresponding to the desktop icon has been installed, the application is started directly; if it has not been installed, whether the terminal has a source file is judged, if it has the source file, installation is executed directly; if it does not have the source file, the application is searched and downloaded through an application market or search engine, and then the original program can be installed, the user can easily get back the backup program, thus user's experience is improved.

DETAILED DESCRIPTION OF THE PRESENT INVENTION

To more clearly understand the above objects, features and advantages of the present invention, the present invention will be further detailed hereinafter in combination with the accompanying drawings and embodiments.

Many details are described hereinafter for fully understanding the present invention, however, the present invention can also be implemented by embodiments other than those described herein, thus, the present invention is not restricted to or limited by the following specific embodiments.

The terminal according to the present invention will be detailed hereinafter referring to FIG. 1, and the term "terminal" used herein may refer to a mobile phone, a notebook computer, a desktop computer, a digital broadcast receiver, a personal digital assistant, a portable multimedia player, a camera, a navigation device, a tablet computer and/or an E-book reader.

Figure 1:
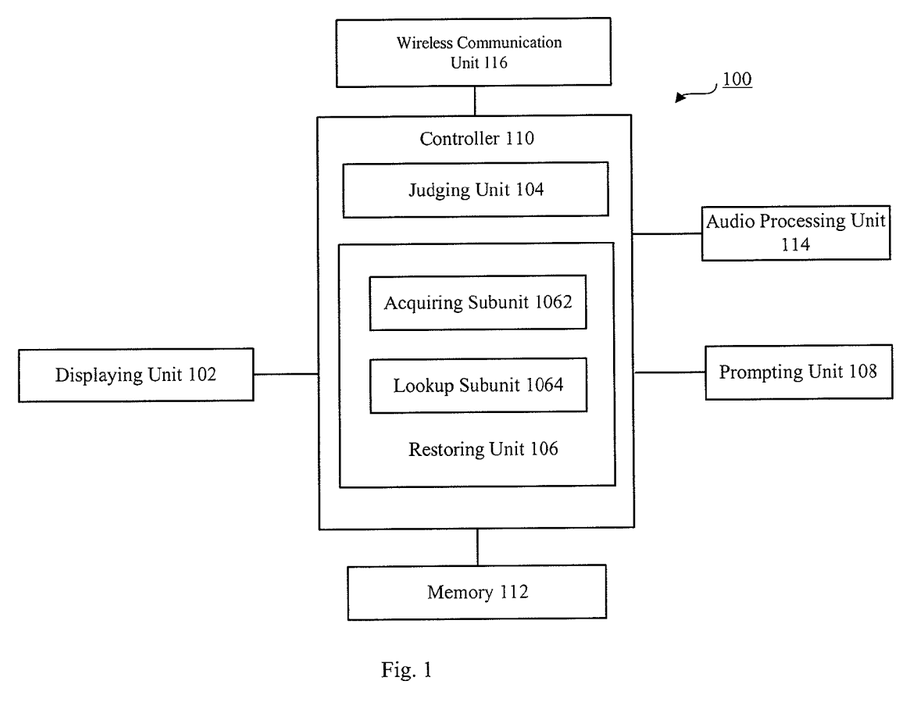
FIG. 1 is a block diagram of an embodiment according to the present invention.

As shown in FIG. 1, the terminal 100 according to the embodiment of the present invention comprises: a displaying unit 102, a judging unit 104, a restoring unit 106 and a memory 112, wherein,
the judging unit 104 is used for judging whether an application corresponding to a desktop icon can run normally upon receiving an operation instruction triggering the desktop icon; and the restoring unit 106 is used for restoring the application in a preset manner when the application cannot run normally. There can be multiple reasons why the corresponding application cannot run normally when the desktop icon is triggered, for example, using the backup of a deleted application that is not restored normally, a damaged application, file missing, system conflict, loading abnormal and etc., and the restoring manners will be different depending on the reasons.

In the situation that the backup of a deleted application that is not restored normally is used, the preset restoring manner of the restoring unit 106 is as follow:

The displaying unit 102 of the terminal 100 is used to display the desktop icon corresponding to a deleted application at the original location of the desktop of the terminal after the deleted application has been restored through a backup file. Wherein, the restoring unit 106 comprises: an acquiring subunit 1062 for acquiring the installation file of the application and installing the application, and/or repairing the association relationship between the desktop icon and the application.

The displaying unit 102 can be a display screen including a touch display screen and a non-touch display screen, wherein, the touch display screen can be pressed or touched by the user to receive a command or information, and comprises a capacitance touch screen and a resistance touch screen.

After the deleted application has been restored through the backup file, the deleted desktop icon can be restored and displayed again at the original location of the desktop of the terminal, and when the desktop icon is triggered, whether the application has been installed can be judged, if it has not been installed, the installation file of the application is acquired, the interface of the application is directly entered after the installation is finished, so that the user can normally use the application, thus user's experience is improved. If the application has been installed, the interface of the application is directly opened.

The restoring unit 106 has many manners to acquire the installation file, and in one preferable manner, the restoring unit 106 is used to acquire the installation file according to the information in the backup file relevant to the application.

As the backup of the application has been made before, the installation file can be found out for the application initiatively through the information in the backup file.

Wherein, the information in the backup file relevant to the application comprises the file name of the installation file, the version information of the installation file, and the key content and/or resource address of the installation file; and the restoring unit 106 can further comprise a lookup subunit 1064 for finding out the installation file based the information relevant the application through a network server or a local server and installing the installation file.

The installation file can be downloaded or searched based on the key information of the installation file through a search engine or other search devices, the desired installation file can be acquired through flexible uses of current networks, the user does not need to input the key information of the installation file to look up the desired installation file, and the whole search and installation process can be completed only with one triggering signal, which is convenient and quick.

Preferably, the restoring unit 106 is further used to extract the installation file from a local storage device (for example, a memory 112) and install the same when the backup file already has the backup of the installation file therein. Of course, if the backup file already has the backup of the installation file, then it will be relatively simple, as it is only necessary to extract the installation file that has been backed up from the local storage device and then install it, which is also convenient and quick. The memory 112 can store various programs needed by the memory 112 to execute various functions, and various displayed contents comprise a static image, a moving image, a phone book, a message, an E-book and etc., and the memory 112 can comprise at least one of a flash memory storage medium, a hard disk storage medium, a card memory (for example, a secure digital memory), a random access memory or a read-only memory.

In another preferable embodiment, the judging unit 104 is further used to judge whether the local storage device stores the installation file therein; the restoring unit 106 is further used to extract the installation file from the local storage device and install it when the judging unit judges that the installation file has been stored, and to find out the installation file and install it through a network server or a local server when the judging unit 104 judges that the installation file has not been stored.

If the backup file does not back up the installation file therein or back up other relevant information of the application, and the local storage device does not have the corresponding installation file, the relevant installation file needs to be downloaded according to the desktop icon through a search engine or application market program, if there is not the search engine or the application market program, it is prompted that the application corresponding to the desktop icon has been deleted and should be downloaded again and installed, and different prompts or functions can be rendered according to different responses.

If the reason why an application cannot run normally is that the application has been damaged, the restoring unit 106 can download the fix pack of the application according to the information of the application and then fix or uninstall the application, and re-install it according to the installation file.

If the reason why an application cannot run normally is that the file of the application is missing, the restoring unit 106 can also download the desired file according to the information of the application and fix it, and then the object of automatically restoring the application and making the application run normally can also be achieved.

If the reason why an application cannot run normally is that system conflict occurs and the system of the terminal may not support the version of the application, re-downloading a program version that the system can support can be prompted, and after obtaining user's agreement, the restoring unit 106 searches the installation file of the application with a corresponding version and installs it.

If the reason why an application cannot run normally is abnormal loading, the restoring unit 106 can run the application again.

Therefore, when the application cannot run normally due to various reasons, the application can be restored by way of automatically using a corresponding restoring manner, thus it is ensured that the user can normally use the application and does not need to restore the application manually, and the efficiency of restoring is improved.

Preferably, the displaying unit 102 of the terminal 100 is further used to display a preset interface or preset information at the desktop icon during restoring the application. After the user clicks the desktop icon, the application is being restored and a preset interface can be displayed, for example, interfaces that can relieve the user's anxiety due to waiting for restoring the application, such as an application restoration prompt interface and an application installation progress interface; and the installation process of the application can be displayed at the desktop icon, such as the execution progress of restoring the application, installation percentage, rolling bar or time still to wait.

Preferably, the terminal according to the present invention can further comprise a prompting unit 108 for prompting that the application has been deleted when the installation file is not acquired. The prompting unit 108 can comprise a vibrator, an audio player and a graph prompting unit.

In any of the above technical solutions, preferably, the displaying unit 102 is further used to gray display the desktop icon when the acquiring subunit fails to acquire the installation file. Gray displaying the desktop icon shows that the application of the desktop icon has not been installed and the corresponding installation file has not been found, if it is necessary to use the application, the corresponding installation file needs to be downloaded again, to avoid user's multiple invalid clicking on the desktop icon or forgetting downloading the application.

As shown in FIG. 1, the controller (which can also be called a processor) 110 can comprise the judging unit 104 and the restoring unit 106, and can control the operation on the terminal 100, for example, the controller 110 can execute various control operations relevant to sending/receiving data, initiating/receiving a voice call and etc.

In addition, the terminal 100 can further comprise a wireless communication unit 116 so that the terminal 100 can interact data with the outside, and a wireless communication unit 210 can comprise a mobile communication module 2104 and a short distance communication module. The mobile communication module can send a wireless signal to at least one of a base station, an external terminal and a server or receive a wireless signal from at least one of the base station, the external terminal and the server through a mobile communication network. The short distance communication module can use various short distance communication technologies such as blue tooth, radio frequency identification, infrared and/or ZigBee. When the terminal is a mobile phone, the audio processing unit 114 can receive an external voice signal and can convert the voice signal into electronic voice data. In a calling mode, the mobile communication module can convert the electronic voice data into data that can be conveniently sent to a mobile communication base station, and then output data acquired through conversion.

Besides the above, the terminal 100 according to the present invention can further comprise an interface unit which can receive data from an external device.

Therefore, the terminal according to the present invention can judge the restored desktop icon: if the application corresponding to the desktop icon has been installed, the application is started directly; if it has not been installed, whether the terminal has a source file is judged, if it has the source file, installation is executed directly; if it does not have the source file, the application is searched and downloaded through an application market or search engine, and then the original program can be installed, the user can easily get back the backup program, thus user's experience is improved.

Figure 2A:
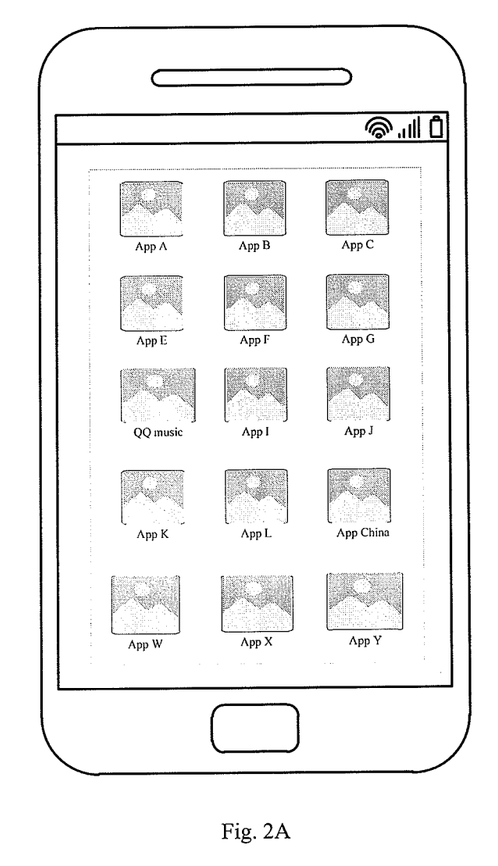
FIGS. 2A-2C are schematic diagrams of the desktops of the terminal according to the embodiment of the present invention.
Figure 2B:
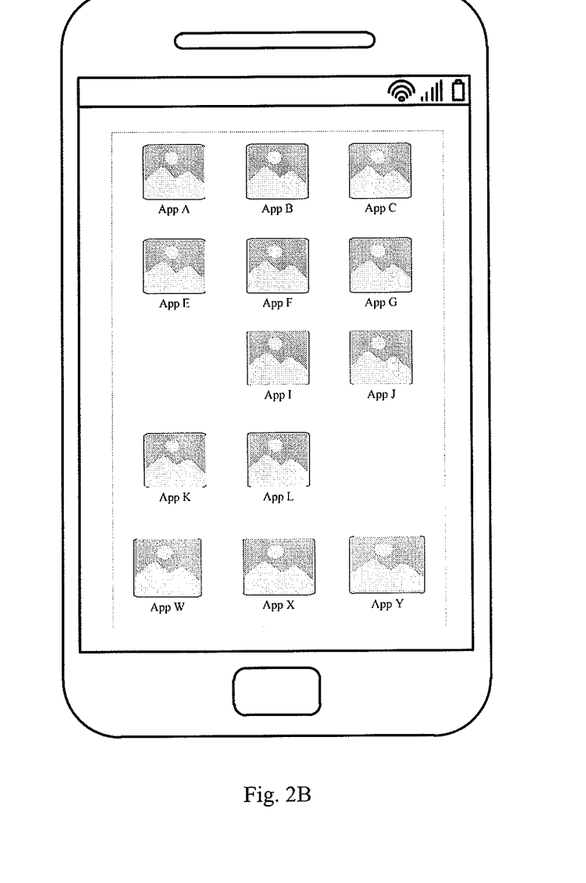
Figure 2C:
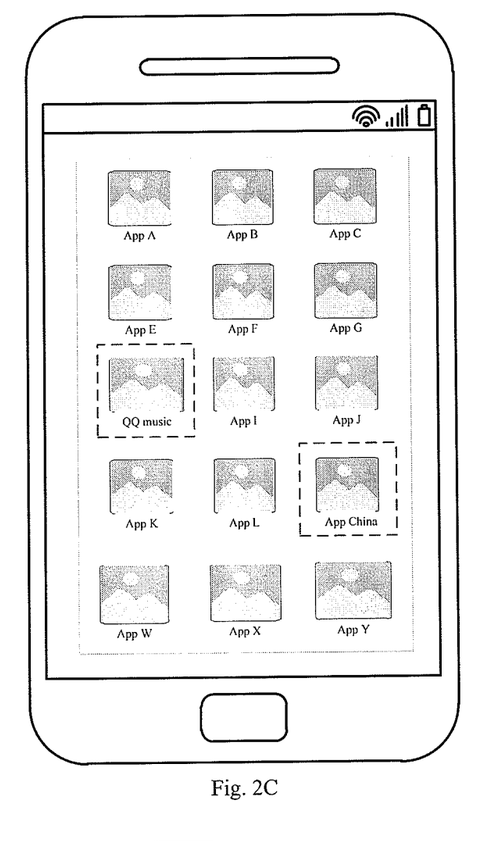

An application scene according to the present invention is described in combination with FIGS. 2A-2C.

As shown in FIG. 2A, before the backup, the user clicks an application already installed at the desktop of the terminal, for example, QQ music, thus the homepage of the QQ music can be opened. Suppose the user makes the backups of the desktop icons of two applications "QQ music" and "AppChina" and their locations, a backup file J is formed.

When the user deletes some applications, for example, the "QQ music" and "AppChina", the application icons at the desktop are also deleted, as shown in FIG. 2B.

The user conducts program restoration through the backup J, and then the desktop icons of the applications such as "QQ music" and "AppChina" still appear at the original locations of the desktop of the terminal, as shown in FIG. 2C.

Figure 3:
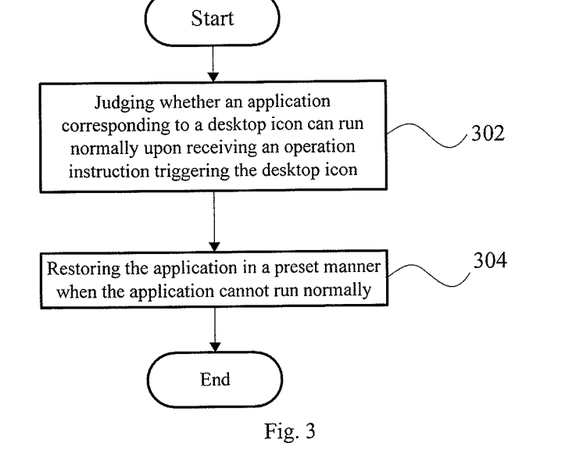
FIG. 3 is a flow chart of the application restoring method according to an embodiment of the present invention.

Now, if the user follows past operations and clicks the desktop icon "QQ music", it is prompted that the application has not been installed or an error is reported, which does not help the user look up the installation file or install it, and then the user cannot normally use the application, thus user's experience is affect. Therefore, the present invention puts forward the following technical solution: FIG. 3 is a flow chart of the application restoring method according to an embodiment of the present invention.

As shown in FIG. 3, the application restoring method according to the embodiment of the present invention can comprise following steps: step 302, judging whether an application corresponding to a desktop icon can run normally upon receiving an operation instruction triggering the desktop icon; and step 304, restoring the application in a preset manner when the application cannot run normally.

Preferably, prior to the step of judging whether the application corresponding to the desktop icon can run normally upon receiving the operation instruction triggering the desktop icon, the method can further comprise: displaying a desktop icon corresponding to a deleted application at the desktop of the terminal when the deleted application is restored through a backup file.

After the deleted application has been restored through the backup file, the deleted desktop icon can be restored and displayed again at the original location of the desktop of the terminal, and when the desktop icon is triggered, whether the application has been mounted is judged, if it has not been installed, the installation file of the application is acquired, and the interface of the application is directly entered after the installation is finished, so that the user can normally use the application, which improves user's experience. If the application has been installed, the interface of the application is directly opened.

Preferably, in an embodiment, in step 304, the step of restoring the application in a preset manner when the application cannot run normally is specifically as follow: acquiring the installation file of the application and installing the application, and/or repairing the association relationship between the desktop icon and the corresponding application.

The process of acquiring the installation file comprises: acquiring the installation file according to information in the backup file relevant to the application, and the information comprises the file name of the installation file, the version information of the installation file, and the key content and/or resource address of the installation file; and finding out the installation file based on the information in a local storage device or through a network server.

As the backup of the application has been made before, the installation file can be found out for the application initiatively through the information in the backup file. The installation file can be downloaded or searched based on the key information of the installation file through a search engine or other search devices, the desired installation file can be acquired through flexible uses of current networks, the user does not need to input the key information of the installation file to look up the desired installation file, and the whole search and installation process can be completed only with one triggering signal, which is convenient and quick.

In the above technical solution, preferably, the installation file is extracted from a local storage device and installed when the backup file already has the backup of the installation file therein. Of course, if the backup file already has the backup of the installation file, then it will be relatively simple, as it is only necessary to extract the installation file that has been backed up from the local storage device and then install it, which is also convenient and quick.

Preferably, in another embodiment, in step 304, the process of acquiring the installation file comprises: judging whether the local storage device stores the installation file therein, if it stores the installation file, extracting the installation file from the local storage device and installing it; if it does not store the installation file, finding out the installation file through a network server or a local server and installing it.

If the backup file does not back up the installation file therein or back up other relevant information of the application, and the local storage device does not have the corresponding installation file, the relevant installation file needs to be downloaded according to the desktop icon through a search engine or application market program, if there is not the search engine or the application market program, it is prompted that the application corresponding to the desktop icon has been deleted and should be downloaded again and installed, and different prompts or functions can be rendered according to different responses.

In another embodiment, in step 304, if the reason why an application cannot run normally is that the application has been damaged, the fix pack of the application can be downloaded according to the information of the application to fix or uninstall the application, and re-install it according to the installation file.

If the reason why an application cannot run normally is that the file of the application is missing, the desired file can also be downloaded according to the information of the application to fix the application, and then the object of automatically restoring the application and making the application run normally can also be achieved.

If the reason why an application cannot run normally is that system conflict occurs and the system of the terminal may not support the version of the application, re-downloading a program version that the system can support can be prompted, and after obtaining user's agreement, the installation file of the application with a corresponding version is searched and installed.

If the reason why an application cannot run normally is abnormal loading, the application can be run again.

Therefore, when the application cannot run normally due to various reasons, the application can be restored by way of automatically using a corresponding restoring manner, thus it is ensured that the user can normally use the application and does not need to restore the application manually, and the efficiency of restoring is improved.

In any of the above technical solutions, preferably, a preset interface is displayed or preset information is displayed at the desktop icon during restoring the application. After the user clicks the desktop icon, the application is being restored and a preset interface can be displayed, for example, interfaces that can relieve the user's anxiety due to waiting for restoring the application, such as an application restoration prompt interface and an application installation progress interface; and the installation process of the application in an IOS (iPhone operating system) can be displayed at the desktop icon, such as the execution progress of restoring the application, installation percentage, rolling bar or time still to wait.

In any of the above technical solutions, preferably, when the application has not been restored, it is prompted that the application has been deleted and/or the desktop icon is gray displayed. Gray displaying the desktop icon shows that the application of the desktop icon has not been installed and the corresponding installation file has not been found, if it is necessary to use the application, the corresponding installation file needs to be downloaded again, to avoid user's multiple invalid clicking on the desktop icon or forgetting downloading the application.

The application restoring method according to the present invention will be respectively detailed hereinafter in conjunction with FIGS. 4-6.

Figure 4:
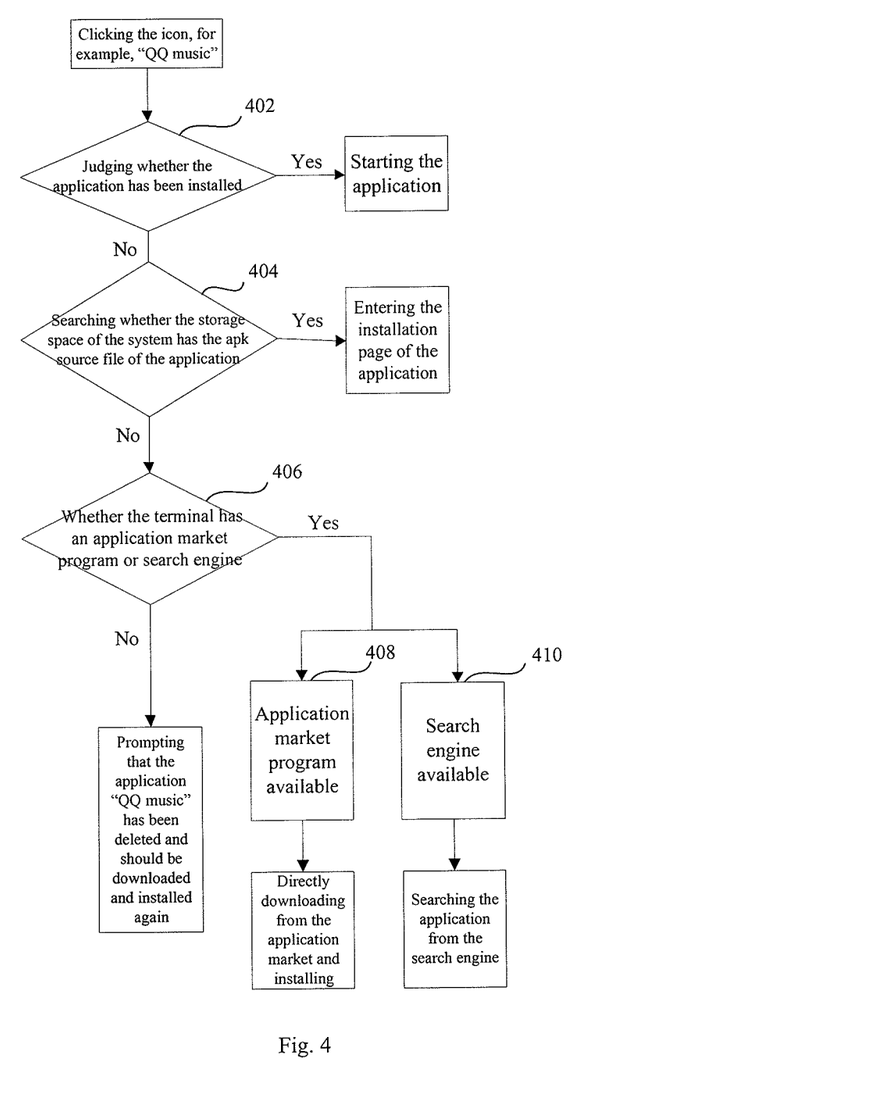
FIG. 4 is a flow chart of the application restoring method according to another embodiment of the present invention.

Suppose the desktop icon "QQ music" clicked by the user is a restored desktop icon and the backup file does not have the backups of the relevant information of the deleted application and the installation file, the application restoring method according to the present invention is shown in FIG. 4.

In step 402, whether the application has been installed is judged, if it has been installed, the application is started directly, and the interface of the application is displayed; if it has not been installed, the flow enters step 404.

In step 404, whether the storage space of the search system, i.e., the storage device of the terminal, stores the APK (android package) source file of the application, i.e., the installation file, if it stores the installation file, the flow directly enters the installation page of the application; if it does not store the installation file, the flow enters step 406.

In step 406, whether the terminal has the search engine or application market program is judged. If it has, the flow enters step 408 or step 410, and if it does not have, it is prompted that the application has been deleted and should be downloaded and installed again.

In step 408, if the terminal has the application market program, for example, applications such as a mobile phone assistant, the corresponding installation file is directly downloaded from the application market and installed.

In step 410, if the terminal has the search engine such as Baidu and Google, the search engine is used to search the relevant installation file through the network, and then the installation file is downloaded and installed.

Figure 5:
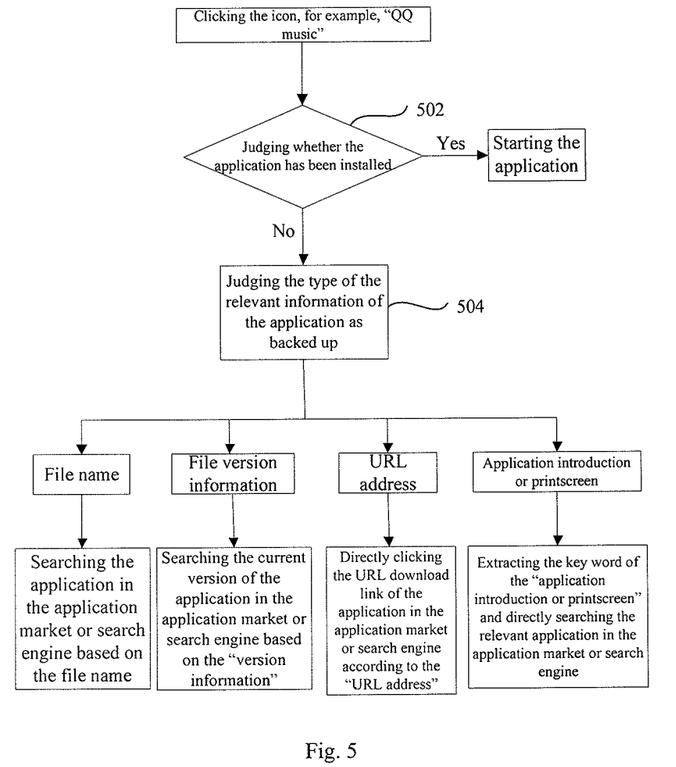
FIG. 5 is a flow chart of the application restoring method according to another further embodiment of the present invention.

Suppose the desktop icon "QQ music" clicked by the user is a restored desktop icon and the backup file has the backups of the relevant information of the deleted application, the application restoring method according to the present invention is shown in FIG. 5.

In step 502, whether the application has been installed is judged, if it has been installed, the application is started directly, and the interface of the application is displayed; if it has not been installed, the flow enters step 504.

In step 504, the type of the information backed up in the backup file relevant to the application is judged.

If the relevant information as backed up is a file name, the installation file of the application is searched according to the file name from the application market or search engine, and then downloaded and installed.

If the relevant information as backed up is file version information, the current version of the installation file of the application is searched according to the file version information from the application market or search engine, and then downloaded and installed.

If the relevant information as backed up is a URL (Uniform/universal Resource Locator) address, the download link of the application is directly clicked according to the URL address in the application market or search engine, and then downloaded and installed.

If the relevant information as backed up is an application introduction or printscreen, the key word in the application introduction or printscreen is extracted, and then the installation file of the relevant application is directly searched in the application market or search engine and downloaded and installed.

Figure 6:
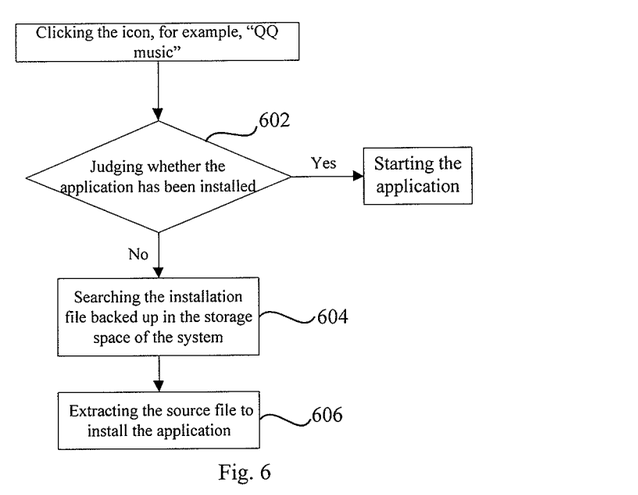
FIG. 6 is a flow chart of the application restoring method according to still another embodiment of the present invention.

Suppose the desktop icon "QQ music" clicked by the user is a restored desktop icon and the backup file has the backup of the installation file of the deleted application, the application restoring method according to the present invention is shown in FIG. 6.

In step 602, whether the application has been installed is judged, if the result of the judging is positive, the application is directly started and the flow enters the display interface of the application; if the result of the judging is negative, the flow enters step 604.

In step 604, the installation file (also called source file) backed up in the storage space of the system of the terminal is searched. In step 606, the source file is extracted and then installed.

The technical solutions according to the present invention are detailed hereinabove in combination with the drawings, and by way of judging the desktop icon as backed up and restored, different functions, such as starting the application, installing the application and searching the application, are executed according to different responses, thus user's experience is improved.

Described above are merely preferred embodiments of the present invention and are not intended to limit the present invention. For one skilled in the art, the present invention may have various alterations and changes. Any alterations, equivalent substitutions, improvements and etc. made within the spirit and principle of the present invention, should be covered in the scope of protection of the present invention.

The invention claimed is:

1. A terminal, comprising:
   a judging unit for judging whether an application corresponding to a desktop icon can run normally upon receiving an operation instruction triggering the desktop icon; and
   a restoring unit for restoring the application in a preset manner when the application cannot run normally, wherein the restoring unit comprises:
     an acquiring subunit for acquiring an installation file of the application and installing the application, and/or repairing an association relationship between the desktop icon and the application, wherein:
       the acquiring subunit is used to acquire the installation file according to information in a backup file relevant to the application, and the information comprises the file name of the installation file, the version information of the installation file, and the key content and/or resource address of the installation file; and
       the restoring unit further comprises a lookup subunit for finding out the installation file based the information through a network server or a local server.

2. The terminal according to claim 1, wherein, a displaying unit of the terminal is further used to display a desktop icon corresponding to a deleted application at the desktop of the terminal when the deleted application is restored through the backup file.

3. The terminal according to claim 2, wherein, the displaying unit of the terminal is further used to display a preset interface or preset information at the desktop icon during restoring the application.

4. The terminal according to claim 2, wherein, the displaying unit of the terminal is further used to gray display the desktop icon when the application has not been restored; and/or
   the terminal further comprises: a prompting unit for prompting that the application has been deleted when the application has not been restored.

5. The terminal according to claim 2, wherein, the displaying unit of the terminal is further used to display preset information at the desktop icon during restoring the application.

6. The terminal according to claim 2, wherein, the displaying unit of the terminal is further used to display a preset interface or preset information at the desktop icon during restoring the application.

7. The terminal according to claim 1, wherein,
   the terminal further comprises: a prompting unit for prompting that the application has been deleted when the application has not been restored.

8. The terminal according to claim 2, wherein, the displaying unit of the terminal is further used to gray display the desktop icon when the application has not been restored; and/or
   the terminal further comprises: a prompting unit for prompting that the application has been deleted when the application has not been restored.

9. An application restoring method, comprising following steps:
   judging whether an application corresponding to a desktop icon can run normally upon receiving an operation instruction triggering the desktop icon; and
   restoring the application in a preset manner when the application cannot run normally, including:
     acquiring an installation file of the application and installing the application, and/or repairing an association relationship between the desktop icon and the application, comprising:
       acquiring the installation file according to information in a backup file relevant to the application, and the information comprises the file name of the installation file, the version information of the installation file, and the key content and/or resource address of the installation file; and
       finding out the installation file based on the information in a local storage device or through a network server.

10. The application restoring method according to claim 9, wherein, prior to the step of judging whether the application corresponding to the desktop icon can run normally upon receiving the operation instruction triggering the desktop icon, the method further comprises:
    displaying a desktop icon corresponding to a deleted application at the desktop of the terminal when the deleted application is restored through the backup file.

11. The application restoring method according to claim 10, wherein, a preset interface is displayed or preset information is displayed at the desktop icon during restoring the application.

12. The application restoring method according to claim 10 wherein, when the application has not been restored, it is prompted that the application has been deleted, and/or the desktop icon is gray displayed.

13. The application restoring method according to claim 9, wherein, preset information is displayed at the desktop icon during restoring the application.

14. The application restoring method according to claim 9, wherein, when the application has not been restored, it is prompted that the application has been deleted.

15. The application restoring method according to claim 9, wherein, a preset interface is displayed or preset information is displayed at the desktop icon during restoring the application.

16. The application restoring method according to claim 9, wherein, when the application has not been restored, it is prompted that the application has been deleted, and/or the desktop icon is gray displayed.

* * * * *